United States Patent
Brasseur (10) Patent No.: US 6,483,321 B2
(45) Date of Patent: *Nov. 19, 2002

(54) CAPACITIVE ANGULAR DISPLACEMENT AND ANGULAR RATE SENSOR AND MEASUREMENT DEVICE FOR SUCH TRANSDUCER

(76) Inventor: Georg Brasseur, Esslergasse 20, Vienna (AT), 1130

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/400,174

(22) Filed: Sep. 21, 1999

(65) Prior Publication Data

US 2002/0014891 A1 Feb. 7, 2002

Related U.S. Application Data

(63) Continuation of application No. PCT/AT98/00076, filed on Mar. 23, 1998.

(30) Foreign Application Priority Data

Mar. 21, 1997 (AT) .............................. A 505/97

(51) Int. Cl.[7] .................. G01R 27/26; G08C 19/10
(52) U.S. Cl. ................. 324/660; 324/686; 324/688; 340/870.37
(58) Field of Search ................. 324/660, 668, 324/662, 661, 690, 686, 688; 340/870.37

(56) References Cited

U.S. PATENT DOCUMENTS

| | | | | |
|---|---|---|---|---|
| 4,843,387 A | * | 6/1989 | Arai et al. ............. | 340/870.37 |
| 4,963,829 A | * | 10/1990 | Wereb ..................... | 324/660 |
| 5,239,307 A | * | 8/1993 | Andermo ............... | 340/870.37 |
| 5,574,442 A | * | 11/1996 | Kinoshita et al. ...... | 340/870.38 |
| 5,598,153 A | * | 1/1997 | Brasseur et al. ........ | 340/870.37 |
| 6,118,283 A | * | 9/2000 | Cripe ....................... | 324/660 |

* cited by examiner

Primary Examiner—N. Le
Assistant Examiner—Anjan K. Deb
(74) Attorney, Agent, or Firm—Welsh & Katz, LTD.

(57) ABSTRACT

The capacitive angular displacement transducer includes a first stator (2) comprising a plurality of electrically conductive; circular ring-shaped electrodes ($5_1$) which are electrically isolated from each other and have a predetermined sector angle, with a second stator (4) arranged parallel to the first stator comprising a receiving electrode (6), and with a rotor (3) mounted on a rotatable shaft (7) comprising at least one rotor blade (8a, 8b) in the form of circle sectors and located perpendicular to the shaft and the rotor blade being located parallel to and between the first and the second stators. The sum of the central angles of all transmitting electrodes is less than $2\pi$ (360°), preferably ranging from $\pi/12$ (30°) to $5\pi/6$ (300°), and the central angle of each rotor blade is essentially equal to the sum of the central angles of n adjacent or neighboring transmitting electrodes. At least one of the stators has a recess or aperture (2a) open toward its outer edge which makes radial introduction of the shaft (7) into the axis region possible during assembly together with the rotor, so that the central angle of this stator (2) is less than 360° and the central angle of the electrode (6) of the second stator (4) is essentially equal to the sum of the central angles of all of the electrodes of the first stator (2).

12 Claims, 5 Drawing Sheets

CAPACITIVE ANGULAR DISPLACEMENT AND ANGULAR RATE SENSOR AND MEASUREMENT DEVICE FOR SUCH TRANSDUCER

This application is a continuation-in-part of international application number PCT AT/98/00076, filed Mar. 23, 1998 (status, abandoned, pending, etc.).

BACKGROUND OF THE INVENTION

1. Field of the Invention

The invention deals with a capacitive angular displacement transducer for the measurement of a rotor angle. It encompasses a first stator plate having a number of electrodes in the form of conductive circular ring sectors with a sector angle respectively predefined. The transmitting electrodes are electrically isolated from each other and parallel to a second stator comprising a receiving electrode. A rotor is perpendicularly mounted on a shaft and located coaxially, between and parallel to both stator plates. The rotor has at least one rotor blade in the form of a circular ring sector, the central angle of each rotor blade being essentially equal to the sum of the central angles of n neighboring transmitting electrodes. Furthermore, the invention deals with a measurement signal processing device which can be used to determine the angular shaft position by means of the capacitive angular displacement transducer.

2. Description of the Prior Art

Such a capacitive angular displacement transducer and measurement signal processing device results from the applicant's U.S. Pat. No. 5,598,153, for example. This well known angular sensor features four or eight sector-shaped transmitting electrodes which fully cover a rotational angle of $2\pi$. The receiving electrode is in the form of a circular ring electrode. The rotor comprises one or two sector-shaped blades, and the shape of each blade has to conform to the rule that the central angle of each rotor blade is equal to the sum of the central angles of two transmitting electrodes of the first stator. The measurement signal processing device of such a capacitive angular transducer includes a generator with four outputs electrically connected to the said four or eight transmitting electrodes of the first stator, as well as an evaluation unit for determining the angular shaft position, connected to the receiving electrode of the second stator. Due to the special geometric properties of the described sensor and to the design of its measurement signal processing unit, a particularly high measurement accuracy is obtained for a measurement range of 360°, although the design is simple in structure and low in cost. The measurement accuracy is almost unaffected by mechanical tolerances such as rotor offset, tilt and the like.

A tile angle transducer known from DE 44 24 538 A1 is not equipped with a transmitting and a receiving electrode, but with an equally designed stator electrode arrangement, whereby the electrodes of the first stator are electrically connected to the electrodes of the second stator and both stators are electrically conductive. The sensor measures the absolute capacitance value, with the objective to obtain the lowest possible frictional resistance, from a first electrode at the first stator by way of a rotor to a second electrode of said first stator, whereby an identical topology of the second stator with corresponding electrodes is connected in parallel. As the principle of operation is non-radiometric, offset and gain error remain uncompensated as a measuring fault in the measuring chain.

A capacitive linear sensor results from EP 0 538 184 A1, whereby a cursor position is determined relative to e.g. a scale equipped with grooves. Thereby, different electrode arrangements at the cursor are disclosed, particularly an arrangement with side by side transmitting, shielding and receiving electrodes.

One task of this invention lies in the further development of the sensor disclosed in U.S. Pat. No. 5,598,153 and its related measurement signal processing device in order to reduce the amount of space consumed by sensor outlines and to achieve easy and simple mounting of all sensor components. Additionally, easy exchange of specific sensor components should be possible, whereby the simple sensor assembly, the low manufacturing cost and the high measurement accuracy should be maintained.

SUMMARY OF THE INVENTION

The task outlined above is accomplished by a sensor of the aforementioned type when at least one stator with an aperture alongside the outer edge is used and the sum of the central angles of all transmitting electrodes is less than $2\pi$, preferably in the range of $\pi/12$ to $5\pi/6$, whereby said aperture is chosen to allow during assembly a radial insertion of the shaft along with the rotor to its correct shaft position. The first stator must have a central angle of less than 360° and the central angle of the electrode of the second stator has to be essentially equal to the sum of the central angles of all electrodes of the first stator and the electrodes of the first stator include two shielding electrodes. These inventive measures make it possible to manufacture a sensor which is less space consuming. Above all, the aperture enables the mounting and dismounting of both stators independently of the rotor and of each other. As the electrode area is reduced at the stator in question, it is no longer necessary to construct it as a circular ring disk. Although less space is required and the production is simple, it is possible to measure an angular range of $2\pi$ with high accuracy using a sensor according to the invention, especially as the shielding electrodes largely prevent field deviations caused by auxiliary influences.

If transmitting segments are excited in pairs, it may happen that neighboring electrode pairs do not directly neighbor but lie apart due to their location at the radial edges of the transmitting segments arrangement facing free space. Consequently, the field distribution will be different in the two cases in question. In response to this, an application variant has been developed where the stator has $2n+1$ ($n \geq 4$) transmitting electrodes. Thus, at any time, n predetermined transmitting electrodes can be electrically coupled to n neighboring transmitting electrodes, so that at any time one single transmitting electrode is available without an electrical link to a neighboring transmitting electrode. This arrangement allows paired electrodes to be directly neighboring at all times, so that whichever pairs of transmitting segment couples are excited, field distribution of the same kind for all electrode pairs results.

Furthermore, it was found to be advantageous if the receiving electrode is in the form of a circular ring sector with a central angle essentially equal to the sum of the central angles of all transmitting electrodes. If necessary, the receiving electrode can be completely surrounded by a shielding electrode.

To achieve a measurement range of $2\pi$ (360°) for the sensor, one advantageous application uses a rotor with at least two blades in the form of circular ring sectors with an equal central angle. In order to obtain a simple but unequivocal relation between the rotor position and the angular shaft position it may be advantageous to use at least two rotor blades with different radial dimensions, whereby the first stator carries two more electrodes in addition to the transmitting electrodes. While the two electrodes have a distance from the shaft which is greater than the radial dimension of a shorter rotor blade, they are located within the area of the radial dimension of a longer rotor blade. Due to the different dimensions of the rotor blades and the corresponding stator electrodes, additional information is obtained in a simple way which provides a reliable absolute angular rotor position.

It is advantageous for practical use to use identical central angles for all transmitting segments, except for the two boundary electrodes located at both radial edges of the stator plate. Corresponding to the expected field distribution, the central angle of the boundary electrodes can be tuned in such a way that at the receiving electrode, on an average, equally sized induced charges (originating from each single transmitting segment) are obtained. Using the expected field distribution as a guideline for sizing he transmitting electrodes proves to be an effective way to achieve a consistent measurement accuracy over the entire measurement range of the sensor.

The sensor's measurement accuracy can be improved further if shielding electrodes shaped as circular ring sectors are arranged alongside the boundaries which point to a radial direction of the first stator, and if the central angle of the receiving electrode of the second stator is essentially equal t the sum of the central angles of all transmitting electrodes plus both shielding electrodes. This leads to slightly more space consumption, but results in an optimal shielding of the sensor along its boundary. Consequently, outside effects leading to possible field deviation inside the sensor can largely be avoided. These measures affect neither the simple sensor assembly nor the exchangeability of sensor components.

Two beneficial but nonlimiting applications arise within the context of this invention, for practical purposes. Either the first stator comprises eight or nine transmitting electrodes with a central angle of approximately $\pi/8$ (22.5°) each and the rotor comprises at least one, preferably two, diametrically opposed rotor blades with a central angle of approximately $\pi/2$ (90°), or the first status comprises eight or nine transmitting electrodes with a central angle of approximately $\pi/12$ (15°) each and the rotor comprises at least one, preferably three, equidistantly spaced rotor blades with a central angle of approximately $\pi/3$ (60°).

In the context of this invention, it should be pointed out that the angular displacement transducer can not only be used to determine both the absolute or relative angular position, but also to determine the angular rate.

We start with an angular displacement transducer of the type described, including a stator with $2n+1$ ($n \geq 4$) transmitting electrodes, from which at any time n predetermined transmitting electrodes can be electrically coupled to n neighboring transmitting electrodes, so that at any time one single transmitting electrode with no electrical link to a neighboring transmitting electrode is available, and including a particularly effective measurement signal processing device which is marked by a combination of the following characteristics: The receiving electrode of the second stator is connected to an evaluation unit capable of processing a single input signal from the receiving electrode, whereby the evaluation unit includes a separation unit to separate the receiving signal with respect to the transmitting signals. A signal processing unit delivers the angular position or the angular rate, and a generator is connected to each single transmitting electrode with one output each. For a predetermined first interval the generator is capable of delivering two identically predetermined first transmitting signals to at least two neighboring transmitting electrodes, and two identically predetermined second transmitting signals to at least two neighboring transmitting electrodes for a predetermined second interval. The transmitting electrode couples belonging to the first transmitting signal are shifted from those transmitting segment couples belonging to the second transmitting signal by at least one electrode. During each of the two intervals at least one of the said transmitting electrodes located at the edge has to be connected to ground.

An additional improvement of the generator and the evaluation unit can be obtained if the generator contains a unit for modulating the transmitting signals with an electrical high frequency signal, and if the evaluation unit contains a carrier frequency amplifier and a demodulator for this high frequency signal. Due to the high frequency modulator (narrow-band system), the sensor is insensitive to disturbing foreign fields and to leakage currents resulting from conductive coatings at the second stator, the receiving disc.

A remarkable improvement of the signal-to-noise ratio can be achieved if a resonant circuit tuned to the carrier frequency is introduced at the receiving electrode of the angular displacement transducer, whereby the capacitor of the resonant circuit includes the capacitance of the receiving electrode.

As a further development, a generator which is able to produce excitation signals between the first interval and the second interval, and after the second interval during a neutral interval can be used in the measurement signal processing device. Such excitation signals should be selected in such a way that an average displacement current is induced at the receiving electrode, largely independent of the angular rotor position. Consequently, a charge amplifier or a carrier frequency amplifier included in the evaluation unit is retracted during intervals during which no measurement activity occurs, to an approximate mid-position, independent of the angular rotor position.

Additional benefits and features of the present invention are noted in the following description of nonrestricting applications of the invention. The description refers to the attached Figures.

DESCRIPTION OF THE PREFERRED EMBODIMENT(S)

Figure 1A:
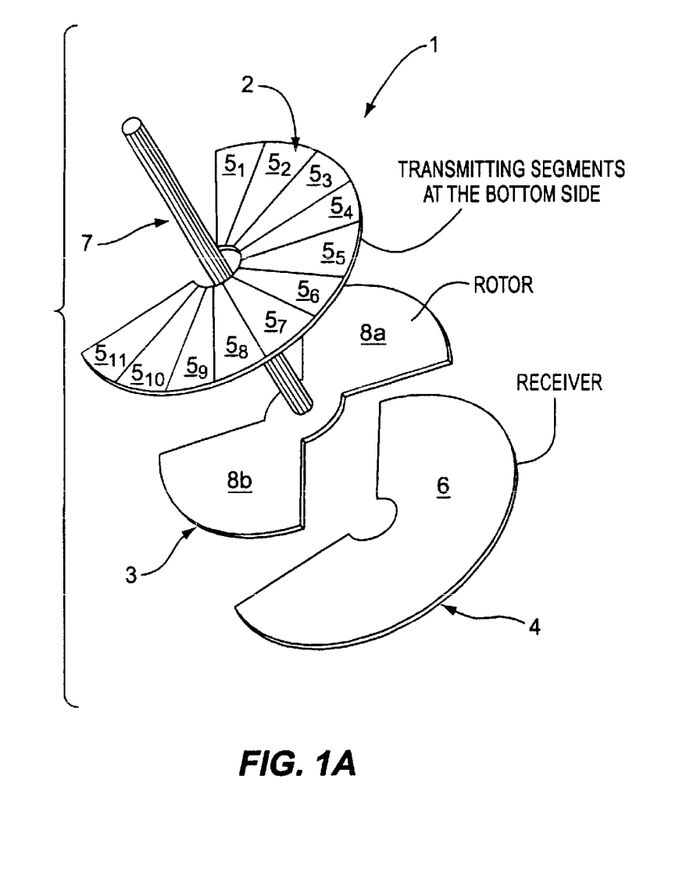
FIGS. 1a, 1b show schematically in a perspective view (FIG. 1a) a first variation of a capacitive angular displacement transducer as used in the invention and in a schematically exploded view of several components (FIG. 1b).
Figure 1B:
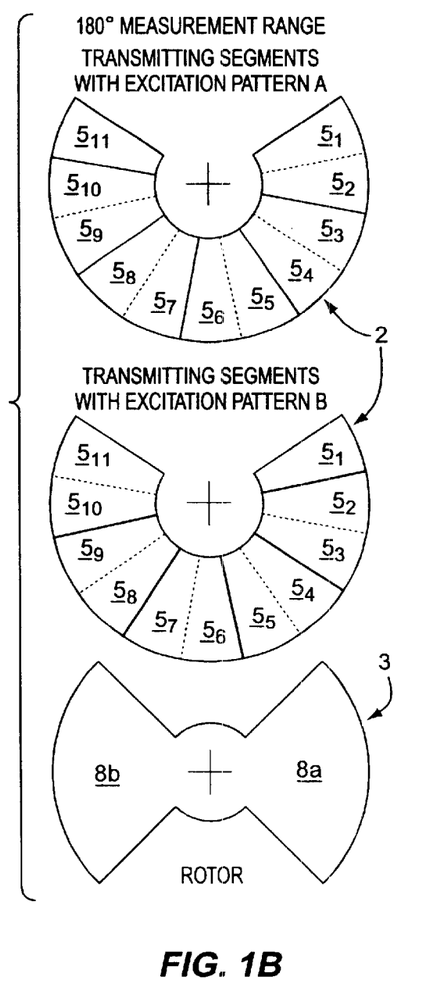

Firstly, with reference to FIGS. 1a and 1b, a capacitive angular displacement transducer 1 is presented, with a first fixed stator 2, a rotor 3 being rotatable along an axis, and a second, equally fixed stator 4, whereby both facing inner surfaces of stators 2, 4 are in parallel alignment and carry the following transmitting and receiving electrodes.

The first stator 2 has, on its inner surface, a number of electrically conducting transmitting electrodes $5_1$, $5_2$, $5_3$, $5_4$, $5_5$, $5_6$, $5_7$, $5_8$, $5_9$, $5_{10}$, $5_{11}$ being isolated from each other and in the shape of a circular ring sector with a predetermined central angle. The transmitting electrodes are arranged on the first stator 2 with their radial boundaries directly neighboring, forming in total a circular ring sector with a central angle being essentially equal to the sum of all central angles of the transmitting electrodes $5_1$, $5_2$, $5_3$, $5_4$, $5_5$, $5_6$, $5_7$, $5_8$, $5_9$, $5_{10}$, $5_{11}$. In the context of this invention, the total central angle of all transmitting electrodes $5_1$, $5_2$, $5_3$, $5_4$, $5_5$, $5_6$, $5_7$, $5_8$, $5_9$, $5_{10}$, $5_{11}$ is less than $2\pi$ and preferably ranges from $\pi/12$ to $5\pi/6$. For a particularly beneficial and practical application of this invention, the total central angle ranges from $\pi/2$ to $3\pi/2$.

The second stator 4 has, on its inner surface, one single electrically conducting receiving electrode 6, shaped as a circular ring sector with a central angle equal to the sum of the central angles of all transmitting electrodes $5_1$, $5_2$, $5_3$, $5_4$, $5_5$, $5_6$, $5_7$, $5_8$, $5_9$, $5_{10}$, $5_{11}$. The receiving electrode 6 is perhaps bordered by an encompassing shield electrode connected to a fixed potential.

A rotor comprising two diametrically opposed rotor blades 8a, 8b is perpendicularly attached to a shaft 7 and can freely rotate between the first and the second stator 2, 4. The rotor blades 8a, 8b can be made out of a conductive material, e.g. metal, or alternatively out of a dielectric material. Another option suitable for this invention uses insulating material coated with metal on both sides with electrical connections to the metal coats as a rotor material, e.g. a through hole plated printed circuit board.

In the application shown, the central angle of each blade 8a, 8b of the rotor 3 is equal to the sum of the central angles of four transmitting electrodes, e.g. $5_2$, $5_3$, $5_4$, $5_5$, whereby at any time two neighboring transmitting electrodes, e.g. $5_2$, $5_3$, are supplied with the same excitation signal.

In considering the actual electrical fields, the sum of the central angles of two transmitting areas is at all times relative to the central angle of one rotor blade, whereby each transmitting area is formed by two neighboring electrode areas. Details of the transmitting segment excitation are explained later in detail with reference to FIGS. 4 and 5.

From the eleven transmitting electrodes $5_1$, $5_2$, $5_3$, $5_4$, $5_5$, $5_6$, $5_7$, $5_8$, $5_9$, $5_{10}$, $5_{11}$, shown in FIGS. 1a, 1b, the two boundary electrodes $5_1$, $5_{11}$ are designated as shielding electrodes, protecting the sensor against external influences, and serve, if needed, to avoid a distortion of the electric field of the outmost transmitting electrodes $5_2$, $5_{10}$. The central angle of such boundary electrodes is adapted to the expected field distribution in order to acquire, on average, equally-sized induced charges at the receiving electrode 6. Furthermore, the receiving electrode 6 of stator 4 can be entirely surrounded by the shielding electrode $6_1$ which is usually connected to a fixed potential, e.g. the ground, like the boundary electrodes $5_1$, $5_{11}$, of stator 2 in order to shield the sensor against interfering radial fields (see the graphical representation of the receiving electrode in FIG. 4).

At any time, eight of the nine transmitting electrodes $5_2$, $5_3$, $5_4$, $5_5$, $5_6$, $5_7$, $5_8$, $5_9$, $5_{10}$ are permanently excited in couples with an electrical voltage signal so that the first stator 2 always uses four transmitting areas. These four areas are shifted during a measurement cycle by a rotational angle of one transmitting electrode. To give an example: If the transmitting electrodes $5_3/5_4$, $5_5/5_6$, $5_7/5_8$ and $5_9/5_{10}$ are coupled in a first measurement phase (refer to FIG. 1 below), the transmitting electrodes $5_2/5_3$, $5_4/5_5$, $5_6/5_7$ and $5_8/5_9$ will be coupled in the second measurement phase (see FIG. 1b above), whereby the transmitting electrode $5_{10}$ remains unused in the first measurement phase, and the transmitting electrode $5_2$ remains unused in the second measurement phase. Unused, in this context, means connected to a ground potential together with the shielding electrodes $5_1$, $5_{11}$, for example.

The measurement cycle described above can, in principal, also be used with a stator 2 having only eight transmitting electrodes (e.g. $5_2$, $5_3$, $5_4$, $5_5$, $5_6$, $5_7$, $5_8$, $5_9$). However, in a specific measurement phase in this variation, two coupled electrodes (e.g. $5_2/5_9$) no longer directly neighbor each other. Consequently, the electric field of the electrode couple has two more boundaries, resulting in a larger field deviation and, in this case, a reduced measurement accuracy has to be expected.

The central angle of all active transmitting electrodes $5_2$, $5_3$, $5_4$, $5_5$, $5_6$, $5_7$, $5_8$, $5_9$, $5_{10}$ is essentially identical, and in the example given, measures $\pi/8$, whereby occasional field deviations at the boundary electrodes $5_2$, $5_{10}$, can be compensated for by adapting the size of the electrodes. In theory, the sum of four transmitting segments fixes the size of the rotor blades 8a, 8b at $\pi/2$. Practically, the fringe fields at the edges of the transmitting electrodes $5_2$, $5_3$, $5_4$, $5_5$, $5_6$, $5_7$, $5_8$, $5_9$, $5_{10}$ create the need to adapt the rotor blade size from the geometrical sum of four transmitting electrodes to the size of the expected transmitting fields. Consequently, in accordance with this invention, the central angle of each blade 8a, 8b of the rotor 3 amounts to $\pi/2\pm\Delta$, whereby delta, if needed, adapts the central angle to the actual field size of a transmitting segment. An alternative to central angle adaptation is a parallel displacing of the radial rotor-blade edges to adapt the blade size. The central angle of the receiving electrode 6 results in a value of $11\pi/8$, if nine active transmitting electrodes and two shielding electrodes are used.

Figure 2A:
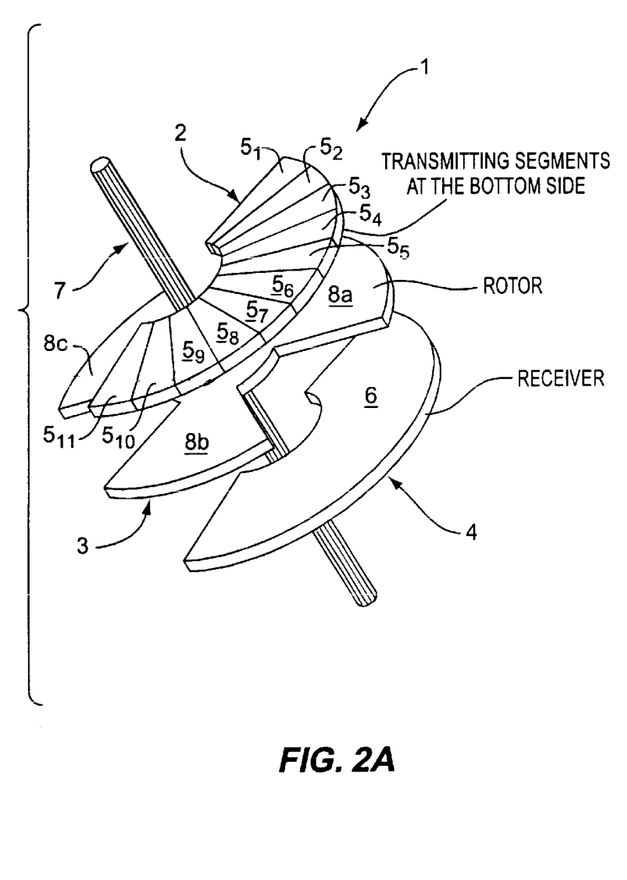
FIGS. 2a, 2b show schematically in a perspective view a second example of a capacitive angular displacement transducer which conforms to the invention (FIG. 2a) and a schematically exploded view of several components (FIG. 2b).
Figure 2B:
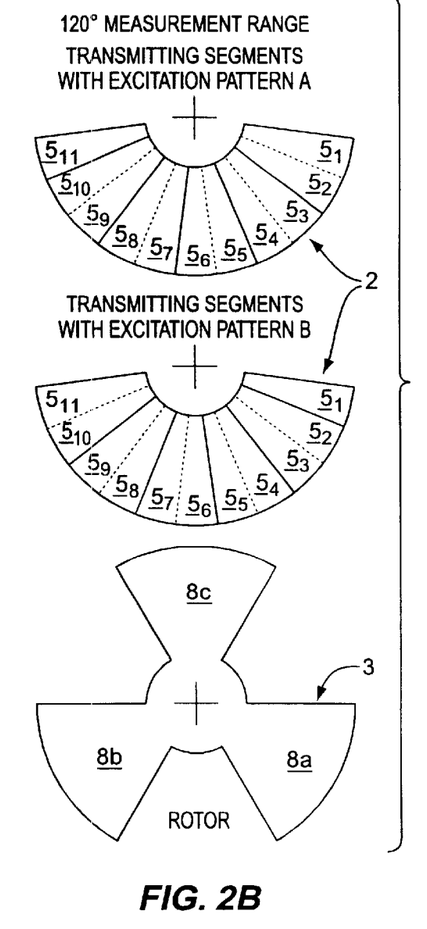

FIGS. 2a and 2b show another variation of an angular displacement transducer 1 and designed in a manner similar to the one presented in FIGS. 1a, 1b. Therefore, the same terms of notation will be used in the following description for similar components and a detailed explanation of those components will be omitted.

In contrast to the previous example, the size of the central angle of a transmitting electrode $5_2$, $5_3$, $5_4$, $5_5$, $5_6$, $5_7$, $5_8$, $5_9$, $5_{10}$ in the angular displacement transducer as shown in FIGS. 2a, 2b is $\pi/12$, or $\pi/6$ when using a pair of transmitting electrodes, so the amount of the central angle of the rotor blade is $2\pi/3$ to comply with the invention. In order to achieve a measurement range of $2\pi$, the rotor 3 has three rotor blades 8a, 8b, 8c. The receiving electrode 6 is designed in the form of a circular ring sector with a central angle of $2\pi/3+\pi/4=11\pi/12$ when using nine transmitting electrodes $5_2$, $5_3$, $5_4$, $5_5$, $5_6$, $5_7$, $5_8$, $5_9$, $5_{10}$ and two shield electrodes $5_1$, $5_{11}$.

The operation of the sensor as shown in FIGS. 2a, 2b is similar to the one shown in FIGS. 1a, 1b, but it has smaller physical dimensions.

Figure 3:
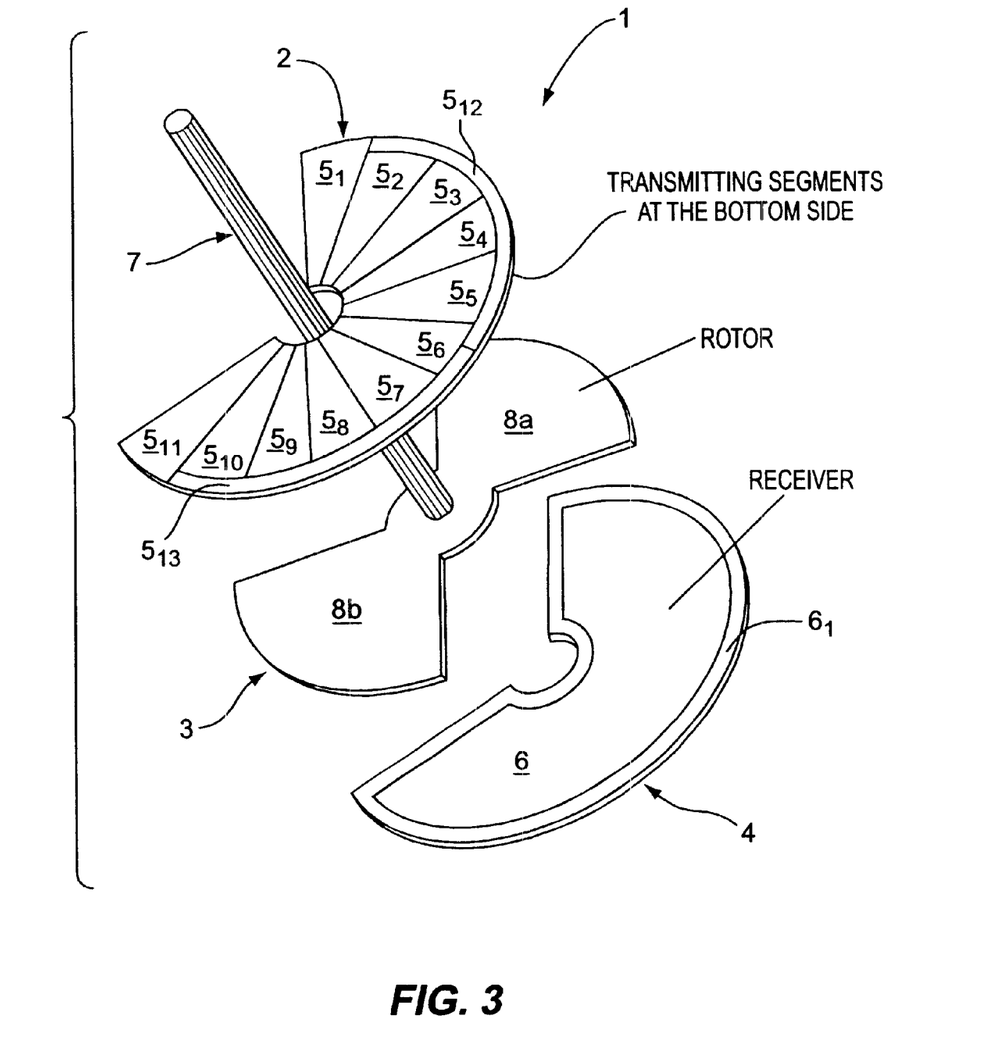
FIG. 3 shows a practical application of the sensor seen in FIG. 1a and 1b.

In FIG. 3 a variation of sensor 1 is shown in accordance with FIGS. 1a, 1b, which allows unambiguous, absolute meaning of the rotor angle over a range of $2\pi$. In this variation, space is allocated along the outer circumference of the active transmitting electrodes $5_2$, $5_3$, $5_4$, $5_5$, $5_6$, $5_7$, $5_8$, $5_9$, $5_{10}$ for two additional transmitting electrodes $5_{12}$, $5_{13}$, shaped as circular ring sectors, which are electrically isolated from each other and from the transmitting electrodes $5_2$, $5_3$, $5_4$, $5_5$, $5_6$, $5_7$, $5_8$, $5_9$, $5_{10}$. Each of the two additional electrodes extends along one half of the total central angle of the transmitter range of the active transmitting electrodes $5_2$, $5_3$, $5_4$, $5_5$, $5_6$, $5_7$, $5_8$, $5_9$, $5_{10}$. In the example shown, with nine active transmitting electrodes the central angle of each of the additional transmitting electrodes $5_{12}$, $5_{13}$ is $9\pi/16$. When using only eight of the active transmitting electrodes the central angle of the additional transmitting electrodes $5_{12}$, $5_{13}$ is $\pi/4$.

To allow simple use of the additional transmitting electrodes $5_{12}$, $5_{13}$, the rotor blades $8a$, $8b$ of rotor 3 have different radial lengths as shown in the example. For instance, the length of rotor blade $8a$ is designed so as not to cover the additional transmitting electrodes $5_{12}$, $5_{13}$. Consequently, it is possible to tell definitely, from the measurement results, which of the rotor blades $8a$, $8b$ is located within the transmitting area of the first stator. The excitation of the additional transmitting electrodes $5_{12}$, $5_{13}$ will be explained more closely later with regard to the measurement signal processing device.

With an angular displacement transducer, as shown in FIGS. 2a, 2b, the additional information about the absolute position could be obtained in a similar way with three rotor blades of different length.

Figure 4:
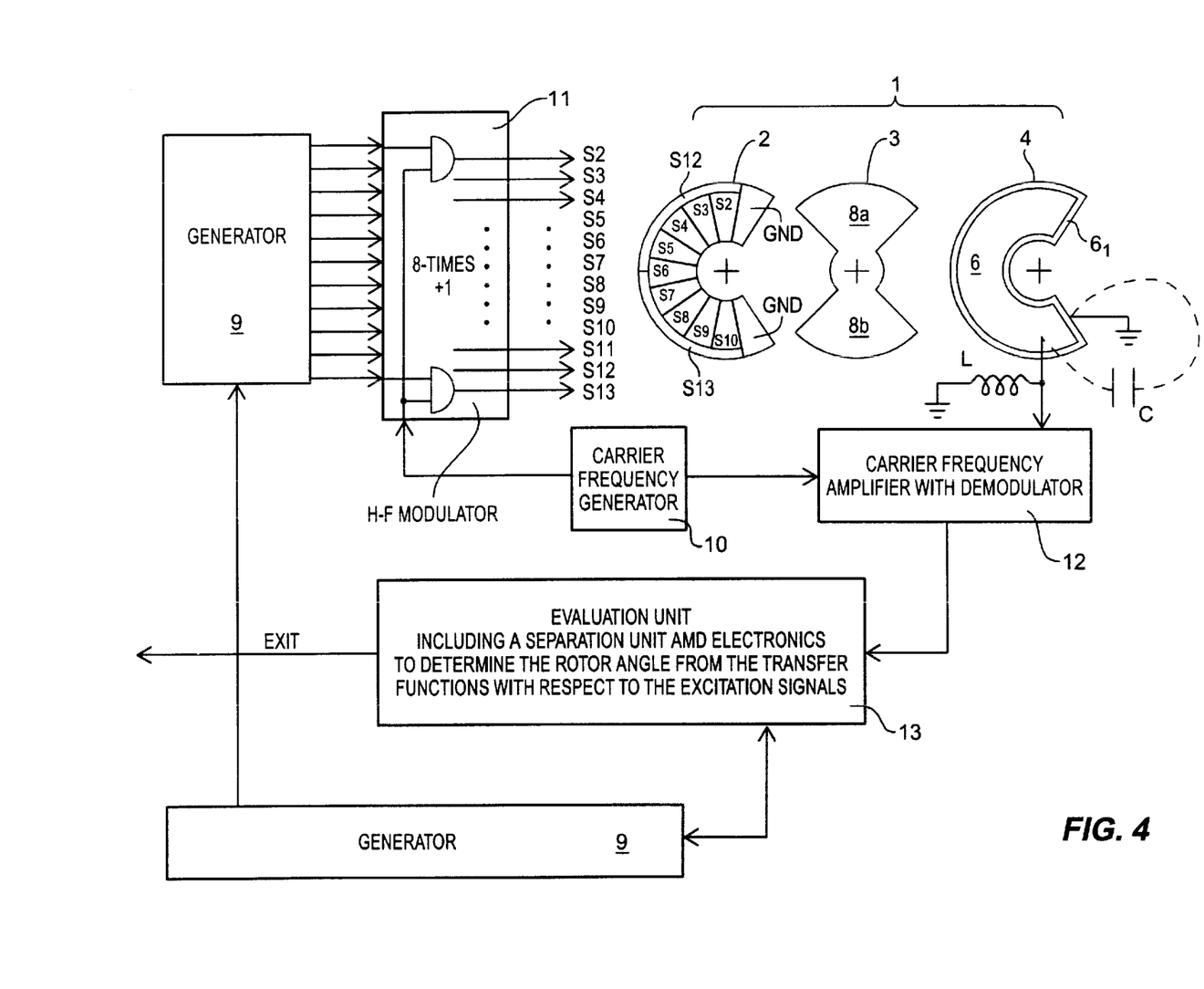
FIG. 4 shows a schematic example of a measurement signal processing device as described i the invention.

FIG. 4 shows a nonlimiting application of a measurement signal processing device, in accordance with the invention, using sensor 1 from FIG. 1a. The setup of the measurement signal processing device is basically similar to the previously mentioned U.S. Pat. No. 5,598,153 A of the application, which is to be regarded expressly as a part of this publication. At this known measurement signal processing device, at least two different antenna signals are used, which can, however, be separated from each other electronically due to their time dependent behavior. Here preferably such signals should be used whose alternating current components are orthogonal in the time domain, like sine and cosine shaped signals or signals showing properties according Walsh-functions or excitation signals applied subsequently with respect to time. The received, mixed signal—a displacement current—is converted to a corresponding voltage level by means of a charge amplifier, and a separation unit, like a filter or a window, splits the signal into two transfer functions from which an evaluation unit determines the mechanical rotor angle.

The measurement signal processing device includes a generator 9, producing four different excitation signals for the active transmitting electrodes $5_2$, $5_3$, $5_4$, $5_5$, $5_6$, $5_7$, $5_8$, $5_9$, $5_{10}$ derived from two electrically separable voltage signals. These four signals are provided selectively by the generator 9 at nine outputs, which are electrically connected to the active transmitting electrodes $5_2$, $5_3$, $5_4$, $5_5$, $5_6$, $5_7$, $5_8$, $5_9$, $5_{10}$. An example of how to control the active transmitting electrodes $5_2$, $5_3$, $5_4$, $5_5$, $5_6$, $5_7$, $5_8$, $5_9$, $5_{10}$ selectively with excitation signals will be illustrated more closely in FIG. 5.

Furthermore, in the example shown, the measurement signal processing device features a HF-modulator 11, supplied by a carrier frequency generator 10, modulating the output signals of the generator 9 with a HF-signal ranging from 100 kHz up to some 100 MHz (e.g. 10.7 MHz). This HF-modulation (narrow band system) with a following carrier frequency amplifier and demodulator 12 makes the sensor less sensitive to disturbance by external fields and leakage currents as a result of conductive coatings at the second stator 4 (receiver disk).

A considerable improvement of signal-to-noise ratio can be achieved in practice by introducing a preselection directly at the sensor location. This can be done, for instance, with a LC-resonant circuit tuned to the frequency. This is indicated in FIG. 4: C is the capacitance value of the receiving electrode 6 versus the ground including an optionally shunted additional capacitor and L is the inductance. A selective voltage magnification at the entry to the amplifier 12 can be obtained by this LC-circuit, whose resonance frequency is about 10.7 MHz (as aforementioned), whereas the amount of the voltage magnification depends on the quality factor of the LC-circuit.

The variation described above (as shown in FIG. 4) includes the HF-generator used for the excitation of the transmitting electrodes, and is in no way restricting. The transmitting electrodes $5_2$, $5_3$, $5_4$, $5_5$, $5_6$, $5_7$, $5_8$, $5_9$, $5_{10}$ can be supplied with the excitation signals even without previous modulation.

Depending on the angular position of rotor 3 within the area of the active transmitting electrodes $5_2$, $5_3$, $5_4$, $5_5$, $5_6$, $5_7$, $5_8$, $5_9$, $5_{10}$, a certain displacement current occurs at the receiving electrode. This current also depends on the excitation signals and the selected type of excitation-in-pairs of the transmitting electrodes. Alternatively, the displacement current can be converted to a voltage signal by a charge amplifier or a carrier frequency amplifier coupled to a following demodulator and fed to an evaluation unit 13 comprising a separation unit. The separation circuit splits the voltage signal with respect to the selected excitation signals into two evaluation signals, from which the angular position or, if necessary, the angular rate can be evaluated by a connected electronic system. The evaluation unit 13 is usually a programmable microprocessor or an ASIC. A more precise explanation of the operation of the evaluation unit 13 can be taken from U.S. Pat. No. 5,598,153 A as mentioned above, so there is no need to go into further details here.

Figure 5:
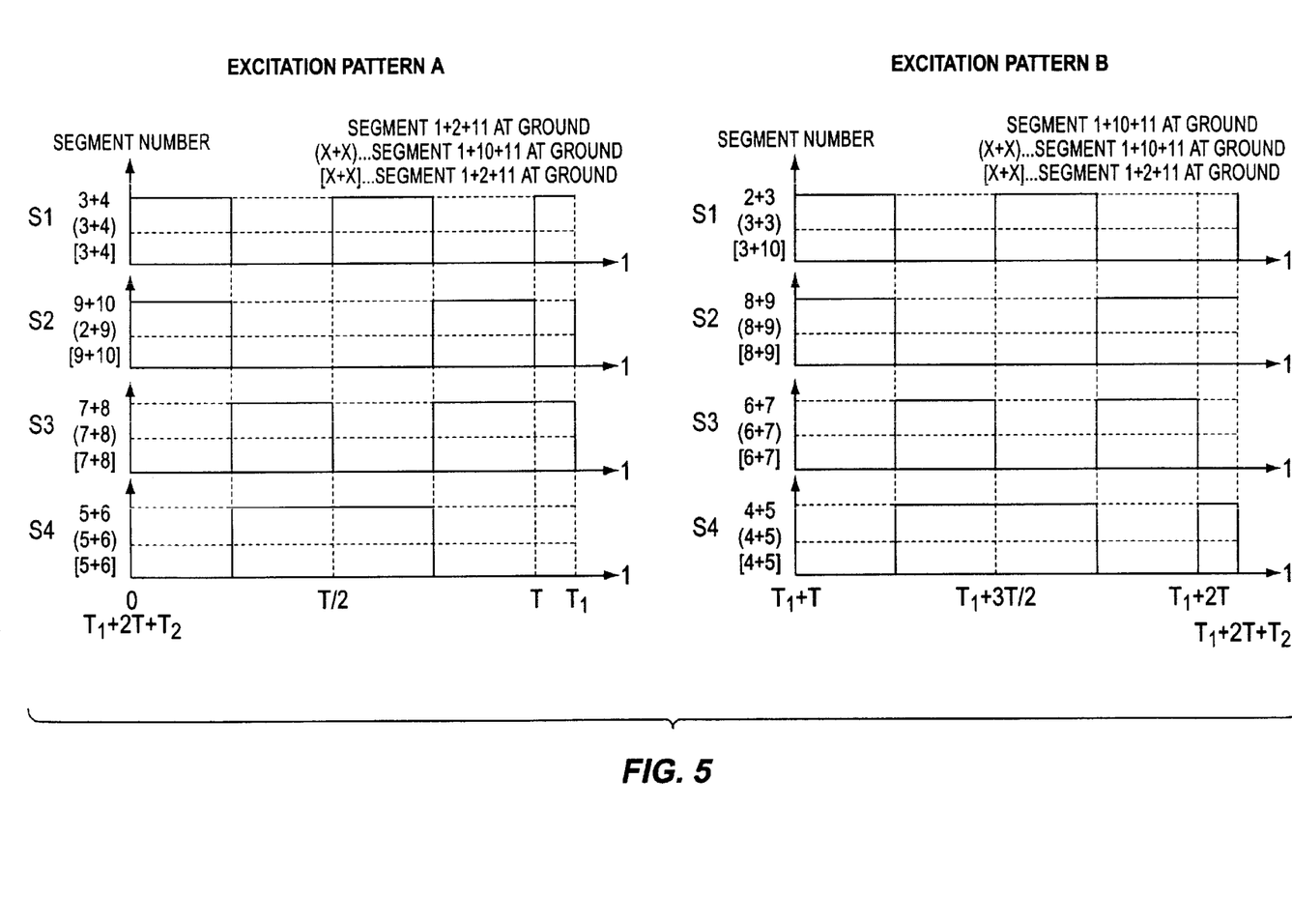
FIG. 5 shows an example of the operation of the excitation signals of the measurement signal processing device in compliance with FIG. 4.

In FIG. 5 there is a nonlimiting example of excitation signals used for the transmitting electrodes $5_2$, $5_3$, $5_4$, $5_5$, $5_6$, $5_7$, $5_8$, $5_9$, $5_{10}$ and their coupling in pairs. The permutative excitation signals $S_1$, $S_2$, $S_3$, $S_4$ are formed by 2 sequentially square wave signals $U_1$, $U_2$ by adding these signals, e.g. $S_1=U_1+U_2$; $S_2=-U_1+U_2$; $S_3=U_1-U_2$; $S_4=-U_1-U_2$ (see FIG. 4 of U.S. Pat. No. 5,598,153 A), whereas the two possible potentials of the excitation signals $S_1$, $S_2$, $S_3$, $S_4$ are fixed with U=0 and U=+U. Therefore, when compared to the original signals $U_1$, $U_2$, the potentials of the excitation signals have an offset of $U_0=+U/2$.

Each measurement procedure of this example consists of two sequentially performed measuring phases.

In the first measurement phase (t=0 until t=T) four signals will be applied to a certain configuration of coupled pairs of neighboring transmitting electrodes with an excitation pattern A, e.g. the Signal $S_1$ will be applied to the electrodes $5_3$ and $5_4$, the signal $S_2$ to the electrodes $5_9$ and $5_{10}$, the signal $S_3$ to the electrodes $5_7$ and $5_8$ and the signal $S_4$ to the electrodes $5_5$ and $5_6$. The transmitting electrode $5_2$ will not be used in this phase, so ground potential will be applied.

After the first measurement phase, a neutral control pattern will be applied during a so-called neutral phase (t=T until t=$T_1$). The purpose of this pattern is to retract the charge amplifier and the carrier frequency amplifier of the evaluation unit into a middle position, and, on the other hand, to make a time interval available for the evaluation unit and the separation circuit in order to evaluate the measurement signals.

In the second measurement phase (t=T+$T_1$ until t=$T_1$+2T) the above four signals $S_1$, $S_2$, $S_3$, $S_4$ are grouped in a specific excitation pattern B and will be applied to a certain configuration of coupled pairs of neighboring transmitting electrodes. In comparison to the first measurement phase the transmitting electrodes are now shifted by one electrode, e.g. the signal $S_1$ will be applied to the electrodes $5_2$ and $5_3$, the signal $S_2$ to the electrodes $5_8$ and $5_9$, the signal $S_3$ to the electrodes $5_6$ and $5_7$ and the signal $S_4$ to the electrodes $5_4$ and $5_5$. The transmitting electrode $5_{10}$ will not be used in this phase, so ground potential will be applied.

As in the first measurement phase, a neutral control pattern will be applied during the interval $t=T_1+2T$ by $t=T_1+2T+T_2$ until the beginning of the next phase.

There are many alternative ways of controlling the sensor with the use of excitation signals, as shown in FIG. 5. Examples of these are depicted in FIG. 5 with electrode numbers in parentheses and square brackets. The control pattern with electrode numbers in parentheses is primarily intended for use with a sensor which has only eight transmitting electrodes.

In principle, any separable (orthogonal) function in the time or frequency domain can be used to excite the transmitting electrodes, e.g. sinus-/cosinus-functions, Walsh-functions or functions with rational frequency ratios, whereas generator 9, for example, supplies four signals created from two of the above separable functions.

In the variation shown in FIG. 3, two additional signals, separable in the time domain, are supplied by the generator to the transmitting electrodes $5_{12}$, $5_{13}$ in order to obtain an exact angular rotor position for a measurement range of $2\pi$. In this example, for instance, during the neutral phase of the first measurement phase, it is possible to supply one of the transmitting electrodes, e.g. electrode $5_{12}$, with ground potential (U=0) while the second electrode $5_{13}$ is supplied with a direct voltage signal (U=+U). During the neutral phase of the second measurement phase, electrode $5_{12}$, for example, can be supplied with a direct voltage signal (U=+U) while the second electrode $5_{13}$ is supplied with ground potential (U=0). This additional information means the exact angular rotor position (valid for a measurement range of $2\pi$) can be obtained by the evaluation unit. In this case, there is only one modification needed for the measurement signal processing device: Generator 9 is able to supply appropriate signals to two more outputs usable for the additional transmitting electrodes. Moreover, the evaluation unit 13 is capable, in terms of logical circuitry, of separating the transmitting signals and of evaluating such signals.

I claim:

1. A capacitive angular displacement transducer including a first stator (2) comprising a plurality of electrically conductive circular ring shaped electrodes ($5_1$) which are electrically isolated from each other and which have a sector angle relative to a second stator (4) which is parallel to said first stator and which comprises a receiving electrode (6), and including a rotor (3) mounted on a rotatable shaft (7) and comprising at least one rotor blade (8a, 8b) in the form of circle sectors and located perpendicularly to the shaft, said rotor blade being located generally parallel to and between said first stator and said second stator, and the central angle of each rotor blade being essentially equal to the sum of central angles of n neighboring transmitting electrodes, characterized in that at least one of the stators has an aperture (2a) alongside the outer edge and the sum of the central angles of all transmitting electrodes is less than $2\pi$, and generally between $\pi/12$ and $5\pi/6$, whereby said aperture is chosen to allow during assembly a radial insertion of the shaft (7) along with said rotor to its correct shaft position, so that the central angle of this stator (2) is less than 360° and the central angle of the electrode (6) of said second stator (4) is essentially equal to the sum of central angles of all electrodes of said first stator (2), and said electrodes of the first stator (2) include two shielding electrodes ($5_1$, and $5_{11}$,), and in that a resonant circuit (L, C) tuned to the carrier frequency is introduced at the receiving electrode (6) of the angular displacement transducer (1), whereby the capacitor (C) of said resonant circuit includes the capacitance of the receiving electrode (6).

2. An angular displacement transducer as claimed in claim 1, characterized in that the stator comprises 2n+1 (n≧4) transmitting electrodes ($5_2$, $5_3$, $5_4$, $5_5$, $5_6$, $5_7$, $5_8$, $5_9$, $5_{10}$), from which at any time n predetermined transmitting electrodes can be electrically coupled to n neighboring transmitting electrodes, so that at any time one single transmitting electrode is available without an electrical link to a neighboring transmitting electrode.

3. A measurement signal processing device for determining the angular shaft position of the shaft of said capacitive angular displacement transducer claimed in claim 2, characterized by the combination of the following: said transmitting electrodes of said first partially circular stator (2) being connected to a generator (9) providing at least four different, electrically separable transmitting signals; a receiving electrode of said second stator (4) being connected to an evaluation unit (13) capable of receiving and processing a single input signal; said evaluation unit (13) comprising a separation unit to separate the receiving signal with respect to the transmitting signals; a unit (13) to determine the angular position or the angular rate; said generator (9) being connected to each single transmitting electrode ($5_2$, $5_3$, $5_4$, $5_5$, $5_6$, $5_7$, $5_8$, $5_9$, $5_{10}$) with one output each; a predetermined first interval (t=0 until t=T) during which said generator (9) is capable of delivering identically predetermined first transmitting signals ($S_1$, $S_2$, $S_3$, $S_4$) to at least two neighboring transmitting electrodes ($5_3/5_4$, $5_5/5_6$, $5_7/5_8$, $5_9/5_{10}$), and each one identically predetermined second transmitting signal $S_1$, $S_2$, $S_3$, $S_4$) being delivered to at least two neighboring transmitting electrodes ($5_2/5_3$, $5_4/5_4$, $5_6/5_7$, $5_8/5_9$) for a predetermined second interval (t=T+$T_1$ until t=$T_1$+2T); the transmitting electrode belonging to the first transmitting signal being shifted from those transmitting segment couples belonging to the second transmitting signal by at least one electrode; and, during each of the two intervals, at least one of the said transmitting electrodes ($5_{10}$, $5_2$) located at the edge being connected to ground.

4. A measurement signal processing device as claimed in claim 3, characterized in that the said generator (9) contains a unit (11) for modulating the transmitting signals with an electrical high frequency signal, and the evaluation unit contains a carrier-frequency amplifier and a demodulator (120 for this high frequency signal.

5. A measurement signal processing device as claimed in claim 3, characterized in that said generator (9) is able to produce excitation signals between the first interval (t=0 until t=T) and the second interval (t=T+$T_1$ until t=$T_1$+2T), and, after the second interval (t=$T_1$+2T until t=$T_1$+2T+$T_1$) and during a neutral interval (t=T until t=T+$T_1$ and t=$T_1$+2T until t=$T_1$+2T+$T_2$), so that an average displacement current is induced at said receiving electrode (6), substantially independent of the angular position of the rotor (3).

6. An angular displacement transducer as claimed in claim 1, characterized in that the receiving electrode (6) is shaped as a partially circular ring sector with a central angle essentially equal to the sum of the central angles of all transmitting electrodes ($5_1, 5_2, 5_3, 5_4, 5_5, 5_6, 5_7, 5_8, 5_9, 5_{10}, 5_{11}$), the receiving electrode 6 being bordered by an encompassing shielding electrode ($6_1$) to a fixed potential.

7. An angular displacement transducer as claimed in claim 1, characterized in that the said rotor (3) comprises at least two rotor blades (8a, 8b, 8c) in the form of circle sectors with an equal central angle.

8. An angular displacement transducer as claimed in claim 4, characterized in that at least two rotor blades (8a, 8b) are provided having different radial dimensions, whereby said first stator (2) carries at least two more electrodes ($5_{12}, 5_{13}$) in addition to the transmitting electrodes ($5_2, 5_3, 5_4, 5_5, 5_6, 5_7, 5_8, 5_9, 5_{10}$), said two electrodes having a distance from the shaft which is greater than the radial dimension of a shorter rotor blade (8a) and said two electrodes being located within the area of the radial dimension of a longer rotor blade (8b).

9. An angular displacement transducer as claimed in claim 1, characterized in that all transmitting electrodes ($5_2, 5_3, 5_4, 5_5, 5_6, 5_7, 5_8, 5_9, 5_{10}$) comprise identical central angles, except for the two boundary electrodes ($5_2, 5_{10}$) which are located at both radial edges of said partially circular stator (2).

10. An angular displacement transducer as claimed in claim 1, characterized in that the shielding electrodes ($5_1, 5_{11}$,) shaped as circular ring sectors are arranged alongside the two boundaries which point to a radial direction of said first stator (2), and that the central angle of the receiving electrode (6) of said second stator (4) is essentially equal to the sum of the central angles of all transmitting electrodes ($5_2, 5_3, 5_4, 5_5, 5_6, 5_7, 5_8, 5_9, 5_{10}$), plus both shielding electrodes ($5_1, 5_{11}$).

11. An angular displacement transducer as claimed in claim 1, characterized in that the said first partially circular stator (2) comprises at least eight transmitting electrodes ($5_2, 5_3, 5_4, 5_5, 5_6, 5_7, 5_8, 5_9, 5_{10}$) with a central angle of approximately $\pi/8$ (22.5°) each and the rotor (3) comprises two, diametrically opposed rotor blades (8a, 8b) with a central angle of approximately $\pi/2$ (90°).

12. An angular displacement transducer as claimed in claim 1, characterized in that the said first partially circular stator (2) comprises at least eight transmitting electrodes ($5_2, 5_3, 5_4, 5_5, 5_6, 5_7, 5_8, 5_9, 5_{10}$) with a central angle of approximately $\pi/12$ (15°) each and the rotor (3) comprises three, equidistantly spaced rotor blades (8a, 8b, 8c) with a central angle of approximately $\pi/3$ (60°).

* * * * *